United States Patent [19]
Howe

[11] Patent Number: 5,575,156
[45] Date of Patent: Nov. 19, 1996

[54] HIGH-LIFT LOW-DROP ABSORPTION HEAT PUMP

[76] Inventor: Lawrence A. Howe, 8101 Chestnut Ave., Bowie, Md. 20715

[21] Appl. No.: 391,190

[22] Filed: Feb. 21, 1995

[51] Int. Cl.$^6$ .............................. F25B 15/00; F25B 15/06
[52] U.S. Cl. ................................................. 62/101; 62/476
[58] Field of Search ........................... 62/101, 103, 476, 62/484, 489; 165/104.12

[56] References Cited

U.S. PATENT DOCUMENTS

| | | | |
|---|---|---|---|
| 3,389,574 | 6/1968 | McGrath | 62/101 |
| 3,831,397 | 8/1974 | Mamiya | 62/476 |
| 4,102,388 | 7/1978 | Blytas | 165/1 |
| 4,337,625 | 7/1982 | Wilkinson | 62/79 |
| 4,512,394 | 4/1985 | Kauffman | 165/86 |
| 4,553,409 | 11/1985 | Furukawa | 62/476 |
| 4,724,679 | 2/1988 | Radermacher | 62/101 |
| 4,732,008 | 3/1988 | DeVault | 62/79 |
| 5,024,063 | 6/1991 | Erickson | 62/101 |

Primary Examiner—William Doerrler
Attorney, Agent, or Firm—Leydig, Voit & Mayer

[57] ABSTRACT

A process and apparatus for absorption heat pumping include supplying heat to a first generator, desorbing vapor from a solution of absorbent and refrigerant in the first generator; in a first absorber, partially absorbing into an absorbent solution the vapor desorbed in the first generator to produce a mixture of vapor and liquid; further absorbing the vapor from the mixture in a second absorber, thereby producing a strong solution and evolving a heat of absorption; vaporizing some of the strong solution by reducing the ambient pressure, thereby extracting heat from a load, supplying absorbent vapor and liquid from the second generator to a third generator to produce more vapor, the third generator receiving the heat of absorption evolved by the second absorber, and leaving a remaining liquid that is pumped to the first absorber; supplying vapor from the third generator to a third absorber in which the vapor is absorbed into an absorbent solution, pumping absorbent solution from the third absorber to the first generator; and supplying absorbent liquid from the first generator to the third absorber.

13 Claims, 5 Drawing Sheets

HIGH-LIFT LOW-DROP ABSORPTION HEAT PUMP

FIELD OF THE INVENTION

This invention relates to absorption heat pump systems and, more particularly, to absorption heat pump systems for high-lift applications.

BACKGROUND ART

Absorption heat pumps (AHPs) are used for comfort cooling, industrial refrigeration, and other uses. Compared to mechanical vapor compression (VC) systems, AHPs have the advantage that very little work input is required for a given amount of cooling. Instead, AHPs use energy in the form of heat to drive the heat pumping process. For example, AHPs that produce chilled water using natural gas as the primary energy source are commercially available. Natural gas-driven AHPs help to alleviate peak electrical utility demand problems caused, in part, by VC chillers.

One particularly interesting application of AHPs is the use of waste heat as the energy source. This technique can drastically reduce the amount of energy and money used for heat pumping. The difficulty lies in finding a good match between the waste heat source and the heat pumping requirement. The waste heat source and heat pumping requirement must be fairly close in both space and time or else significant costs are encountered in transporting or storing energy.

One significant limitation on the use of waste heat is the temperature of the waste heat. The higher the temperature of waste heat, the more useful it is for driving an AHP. However, high-temperature waste heat is also more likely to find alternative uses, for example, the preheating of boiler feedwater. Therefore, it is desirable to have an AHP that can utilize very low-temperature waste heat.

AHPs can be designed to exchange heat with almost any number of heat sources and sinks at different temperatures. However, the most common applications involve three temperatures. At the lowest temperature, $T_l$, the AHP draws heat $Q_l$. At an intermediate temperature, $T_i$, the AHP expels heat $Q_i$. At the highest temperature, $T_h$, the AHP draws heat $Q_h$. In one common application, usually called refrigeration, $Q_l$ is drawn from a refrigerated space, $Q_i$ is expelled to the ambient (air, water, or earth), and $Q_h$ is the driving energy. In another common application, commonly called heat pumping, $Q_l$ is drawn from the ambient, $Q_i$ is delivered to a heating load, and $Q_h$ is the driving energy.

The quantity $(T_i-T_l)$ is referred to as the lift, and $(T_h-T_i)$ is called the drop. These terms indicate that one quantity of heat is lifted from $T_l$ to $T_i$ while another quantity of heat drops from $T_h$ to $T_i$. For a given application, a maximum practical drop will be determined by $T_h$ and $T_i$. The design of the AHP will, in turn, determine the maximum practical lift. The lift will, in turn, determine a minimum possible value of $T_l$. For example, using the well-known single-effect cycle design, if $T_h$ is waste heat at 180° F. and $T_i$ is the ambient at 90° F., a drop of 90° F., then $T_l$ cannot be lower than about 40° F., a maximum lift of about 50° F., in practical equipment. In this example, the single-effect cycle is useful only for comfort cooling, e.g., air conditioning for human comfort. Although most of the available waste heat is produced in the industrial sector, most comfort cooling demand is in the residential and commercial sectors. Thus, the industrial waste heat at lower temperatures is discarded.

In order to utilize the low-temperature waste heat generated in the industrial sector, it is desired that an AHP provide, for an available drop, a much larger lift, i.e., produce a lower temperature fluid, than the single-effect cycle. That result is achieved in the invention. With 180° F. waste heat and a 90° F. ambient, a drop of 90° F., the invention can produce refrigeration at −20° F. or colder, a lift of 110° F., which is much more useful for industrial applications than cooling to only about 40° F.

In order to understand the invention, it is helpful to discuss the operating principles of AHPs. FIG. 1 schematically depicts a known single-effect AHP heat cycle and the mechanical components effecting the cycle, superimposed on a simplified ammonia-water, i.e., refrigerant-absorbent, vapor-liquid-equilibrium (VLE) diagram. On this diagram, vertical lines represent constant temperature processes and horizontal lines represent constant pressure processes. Diagonal lines represent a fixed concentration refrigerant-absorbent mixture, ranging from 100% ammonia to 100% water. Vapor streams are indicated by dashed lines while liquid streams are indicated by solid lines and heat flow is indicated by serpentine lines.

A high-pressure stream of almost pure liquid refrigerant is supplied to a valve, capillary tube, or restrictor 10 and thence to the inlet of an evaporator 12. The evaporator 12 draws heat 14 from an external load. The heat 14 boils the refrigerant. The refrigerant vapor passes from an outlet of the evaporator 12 to one inlet of an absorber 20.

A hot, high-pressure refrigerant-absorbent solution with a relatively low ammonia concentration (a "weak" solution) is supplied to a restrictor 18 and thence to a second inlet of the absorber 20. Inside the absorber 20, vapor from the evaporator 12 is absorbed into the weak solution flowing from the restrictor 18, resulting in a solution with an increased ammonia content (a "strong" solution). The heat of absorption 22 is carried away by a cooling medium, such as air or water.

The strong solution is pumped from an outlet of the absorber 20 via a pump 24 and a solution heat exchanger (SHX) 32 to an inlet of a generator 16. Externally supplied heat 26 partially boils the strong solution in the generator 16. The remaining liquid in the generator 16 is supplied from one outlet of the generator 16 to the restrictor 18 via the SHX 32. The vapor generated in the generator 16 is supplied from a second outlet of the generator 16 to an inlet of a condenser 28.

In the condenser 28, the vapor from generator 16 condenses into a liquid. The heat of condensation 30 is removed by a cooling medium. (Depending on the refrigerant-absorbent pair used, vapor from generator 16 may pass through a rectifier (not shown) before entering the condenser 28 in order to reduce the amount of absorbent in the vapor.) The liquid produced in the condenser 28 is then supplied from an outlet of the condenser 28 to the restrictor 10 to continue the cycle.

FIG. 2 depicts a known resorber cycle. It is similar to the single-effect cycle described with respect to FIG. 1 except that the evaporator 12 and the condenser 28 are replaced by a generator 34 and an absorber 40, respectively, and a pump 38 and an SHX 44 are added. Like reference numbers indicate the same apparatus elements and heat quantities in both of FIGS. 1 and 2. The resorber cycle of FIG. 2 has more flexibility in operating pressures than the single-effect cycle of FIG. 1, but it is more complex and generally less efficient than the single-effect cycle, and, thus, is seldom used.

In the resorber cycle of FIG. 2, a high-pressure stream of strong solution is supplied to the restrictor 10 and thence to an inlet of the generator 34. The generator 34 draws heat 36 from an external load, partially boiling the working fluid. The remaining liquid is pumped from an outlet of the generator 34 by the pump 38, via the SHX 44, to one inlet of the absorber 40. Inside the absorber 40, vapor received at a second inlet from the outlet of the generator 16 absorbs into the liquid from the pump 38, resulting in a strong, high-pressure solution that is supplied to the restrictor 10 via the SHX 44. The heat of absorption 42 is rejected to a cooling medium.

Each of the mechanical components shown in FIGS. 1 and 2, the restrictors 10 and 18, the evaporator 12, the absorbers 20 and 46, the pumps 24 and 38, the solution heat exchangers 32 and 44, the generators 16 and 34, and the condenser 28, are all conventional and are readily available from commercial suppliers.

Much of the research on AHPs has been devoted to increasing efficiency. For example, see Erickson, U.S. Pat. No. 5,024,064, and DeVault, U.S. Pat. No. 4,827,728. While efficiency is important, this effort has led away from high-lift, low-drop systems. In all of the more efficient systems, including double-effect, triple-effect, variable effect, and generator-absorber heat exchange (GAX) systems, the available lift is actually smaller than what would be achieved by a single-effect cycle for a given drop. This reduced lift is largely a consequence of the Second Law of Thermodynamics which dictates that, in general, more efficient systems must have a smaller lift relative to the drop.

U.S. Pat. No. 4,337,625 to Wilkinson discloses a method of achieving a larger lift. Its approach is a variation of the half-effect and one-third-effect cycles. While this approach can achieve the desired cooling, it is complicated. Wilkinson's apparatus includes three or four different pressure levels, two or three pumps, and up to eight heat exchangers. The present invention uses fewer components, is easier to operate, and can be significantly more efficient than Wilkinson's system.

Both the invention and the previously-known half- and one-third-effect cycles have low efficiency. A coefficient of performance (COP) of 0.15 to 0.30 can be expected, compared to 0.70 for the single-effect cycle and 1.25 for double-effect cycles. Because of their low efficiencies, these cycles and AHPs using these cycles have not been investigated. However, these cycles and AHPs using these cycles have the advantage that they can use low-temperature waste heat that frequently has no other use. In addition, the invention has the advantage of producing a high lift so that relatively low temperature waste heat produces a chilled fluid at a low enough temperature for advantageous industrial usage.

SUMMARY OF THE INVENTION

A process for absorption heat pumping includes supplying heat to a first generator, thereby desorbing vapor from a solution of absorbent and refrigerant in the first generator; supplying the vapor desorbed in the first generator to a first absorber in which the vapor is partially absorbed into an absorbent solution, thereby producing a mixture of vapor and liquid; supplying the mixture from the first absorber to a second absorber in which vapor is further absorbed into the absorbent solution, thereby producing a strong solution and evolving a heat of absorption; reducing the ambient pressure of the strong solution in a second generator, thereby vaporizing some of the strong solution and extracting heat from a load; supplying absorbent vapor and liquid from the second generator to a third generator, thereby producing more vapor and leaving a remaining liquid, the third generator receiving the heat of absorption evolved by the second absorber; pumping the remaining liquid from the second generator to the first absorber; supplying vapor from the third generator to a third absorber in which the vapor is absorbed into an absorbent solution; pumping absorbent solution from the third absorber to the first generator; and supplying absorbent liquid solution from the first generator to the third absorber.

An apparatus for absorption heat pumping includes a first generator receiving heat from an external heat source for generating an absorbent vapor from a solution of absorbent and a refrigerant; a first absorber connected to receive the vapor from the first generator and cooled by an external source of cooling; a second absorber connected to receive absorbent vapor and liquid from the first absorber and cooled by the evolution of heat; a second generator connected to receive absorbent liquid from the second absorber and for drawing heat from a load; a third generator connected to receive liquid and vapor from the second generator and to receive the heat evolved by the second absorber; and a third absorber connected to receive absorbent liquid from the first generator and absorbent vapor from the third generator, the third generator and third absorber being connected to supply absorbent liquid to the first generator and the first absorber.

BRIEF DESCRIPTION OF THE DRAWING FIGURES

In all figures, the same reference numerals designate the same or like elements.

DETAILED DESCRIPTION OF PREFERRED EMBODIMENTS

In the following description, the refrigerant-absorbent pair of ammonia water is used for illustration. However, this invention applies to any refrigerant-absorbent pair. Examples of such refrigerant-absorbent pairs are: ammonia and an amine, e.g., monomethylamine, dimethylamine, trimethylamine, or a mixture of them with or without water; or organic mixtures, e.g., hydrocarbons, hydrofluorocarbons, fluorocarbons, alcohols, and ethers; and the nitrates and nitrate salts of the alkali metals in combination with water.

Figure 1:
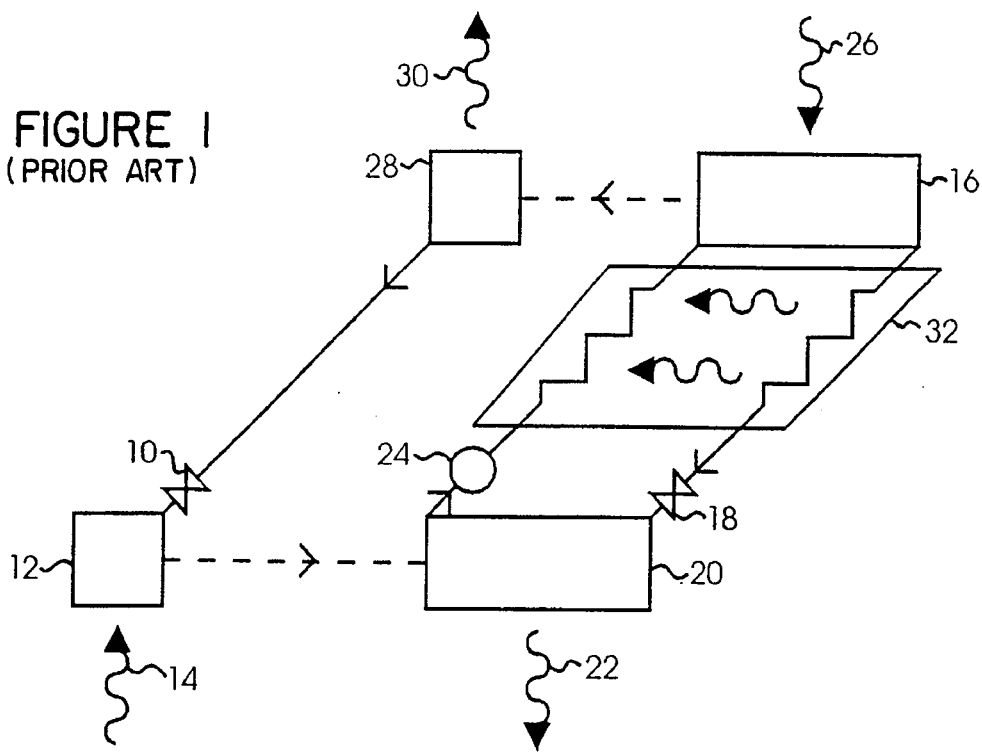
FIG. 1 is a schematic diagram of a known single-effect cycle superimposed on a vapor-liquid-equilibrium diagram.
Figure 2:
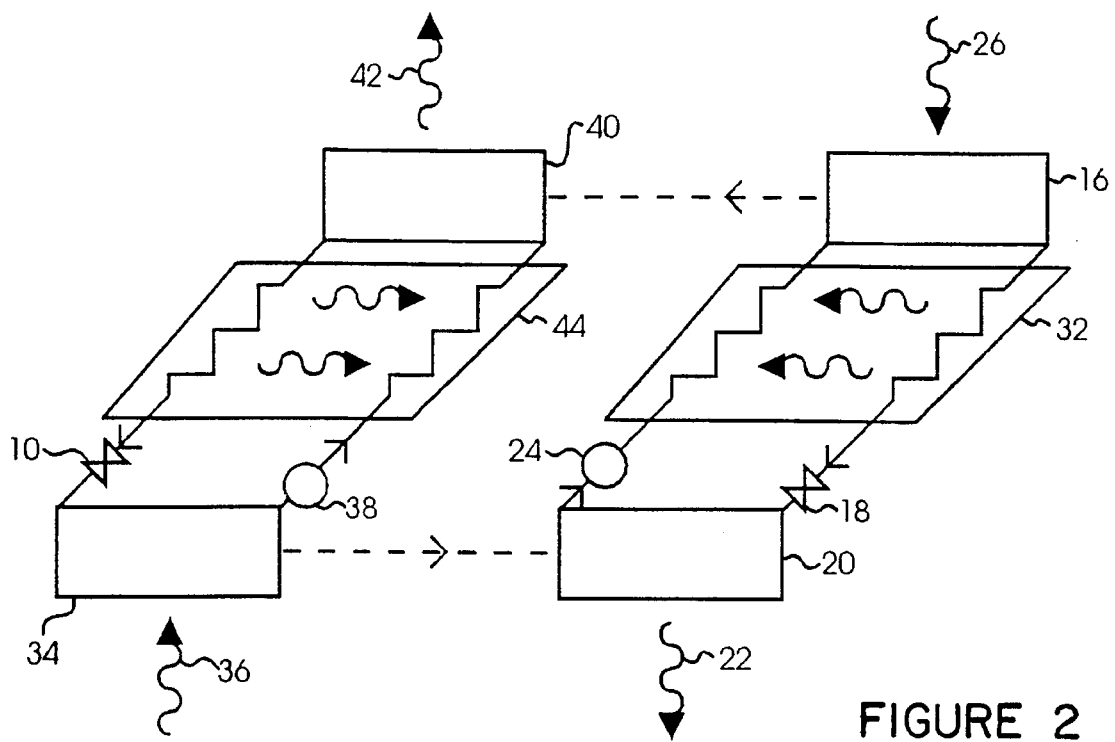
FIG. 2 is a schematic diagram of an apparatus using a known resorber cycle superimposed on a vapor-liquid-equilibrium diagram.
Figure 3:
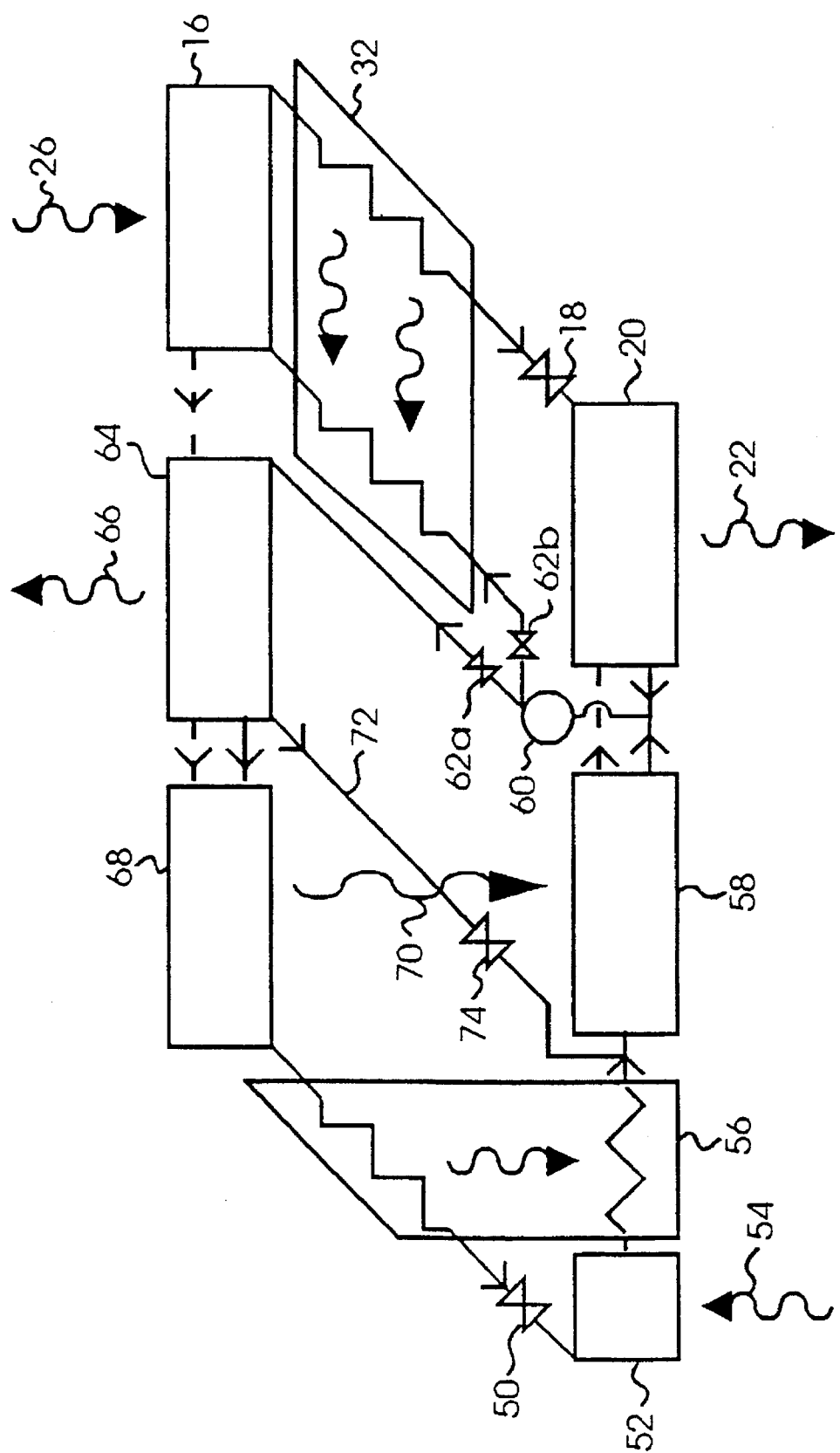
FIG. 3 is a schematic diagram of one embodiment of the invention superimposed on a vapor liquid-equilibrium diagram.

FIG. 3 is a schematic diagram of a preferred embodiment of the invention. The elements 16, 18, 20, 22, 26, and 32 are the same in FIG. 3 as in FIG. 1. A relatively high-pressure strong solution passes from an outlet of an absorber 68 through part of an optional refrigerant heat exchanger (RHX) 56 where it gives up heat and its temperature is reduced. The solution then passes through a restrictor 50 to an inlet of a partial evaporator, generally referred to here as a generator, 52. The generator 52 receives heat 54 from an external load, cooling the load and partially boiling the solution. A two-phase (vapor and liquid) solution passes from an outlet of the generator 52 to the second part of the RHX 56 where it receives additional heat and is further boiled. The two-phase solution then passes to an inlet of a generator 58 where it is further boiled by the heat 70 evolved from the absorber 68. The vapor portion passes from one output of the generator 58 to one inlet of the absorber 20 and is absorbed in a liquid. The use of heat 70 evolved from the vapor absorber 68 to further boil, in the vapor generator 58, the two-phase solution received from the vapor generator 52 produces an important advantage. This additional heating of the two-phase solution means that the temperature difference between the absorber 20 and the generator 52 is much larger than in the conventional apparatus and process. Because the lift is defined by this temperature difference, the lift is much larger than in conventional systems. Because of the higher lift, the temperature of the fluid cooled is much lower than in conventional systems and, therefore, of substantially greater utility.

The remaining liquid in the generator 58 is at nearly the same temperature and concentration as the liquid produced by the absorber 20. Therefore, the two liquid streams from respective outlets of the generator 58 and the absorber 20 can be combined without excessive losses. This combination reduces the number of pumps in the apparatus to one, a simplification that is advantageous in some applications. The combined liquid stream is pumped by a pump 60 to valves 62a and 62b. The valve 62a controls the flow of solution to one inlet of an absorber 64, and the valve 62b controls the flow of solution to the SHX 32 and further to the inlet of the generator 16. The valves 62a and 62b are adjusted or controlled to maintain desired liquid levels and flow rates in the various components of the apparatus. For example, if too much liquid flows through the valve 62b, the generator 16 or the absorber 20 may be overfilled. A manual or automatic control system may be employed to prevent the overfilling.

Vapor from a second outlet of the generator 16 supplied to a second inlet of the absorber 64 is partially absorbed into the liquid in the absorber 64 supplied through the valve 62a. The heat of absorption 66 is rejected, i.e., evolved, and transferred to a cooling medium. The two-phase solution passes from outlets of the absorber 64 to the absorber 68 where the absorption process is completed, resulting in a strong solution supplied from the outlet of the absorber 68 to the optional RHX 56 and the restrictor 50. The heat of absorption 70 evolved from the absorber 68 is supplied to the generator 58.

The heat 70 may be supplied directly to the generator 58 when the absorber 68 and the generator 58 are incorporated into a single heat exchanger. For example, the vapor absorption process of the absorber 68 could be performed in the tube side of a shell-and-tube heat exchanger while the vapor generation process of the generator 58 could be performed simultaneously in the shell side of the same exchanger. Although shell-and-tube heat exchangers are used for illustration, any type of heat exchanger may be used.

Alternatively, the heat exchange can be effected through an intermediate heat transfer medium. For example, the vapor absorption process of the absorber 68 could be performed in the tube side of a first heat exchanger while the vapor generation process of the generator 58 could be performed in the shell side of a second exchanger. A heat transfer medium, such as water, brine, or glycol, is pumped in a continuous loop from the shell side of the first exchanger, through the tube side of the second exchanger, and back to the first exchanger. The heat transfer medium picks up the heat of absorption 70 from the absorber 68 and delivers that heat to the generator 58. This configuration is commonly called a "run-around loop".

An optional branch conduit 72 and a restrictor 74 connecting an outlet of the absorber 64 to the inlet of the generator 48 can be used to improve system performance. In many cases, the amount of heat required by the generator 58 will be less than the amount of heat produced by the absorber 68. This heat mismatch lowers system efficiency. A portion of the liquid exiting through a second outlet of the absorber 64 is passed through the conduit 72 and the restrictor 74 to the inlet of the generator 58. This bypass flow reduces the solution flow rate through the absorber 68 which reduces the amount of heat 70 produced. Simultaneously, the solution flow rate through the generator 58 is increased, increasing the heat requirement. The restrictor 74 is adjusted or controlled to maintain a close match between the heat requirement of the generator 58 and the heat production of the absorber 68. For example, the restrictor 74 may be adjusted so that the amount of heat 54 drawn by the generator 52 is maximized.

FIG. 3 illustrates the benefit of the invention. The lift is the difference between the temperatures of the absorber 64 and the generator 52. The drop is the difference between the temperatures of the generator 16 and the absorber 20. The drop in the system of FIG. 3 is the same as in FIG. 1. However, the lift is larger in FIG. 3 than in FIG. 1. Thus, relative to the known single-effect and resorber cycles, the lift produced in the system of FIG. 3 is increased but the drop remains the same.

Figure 4:
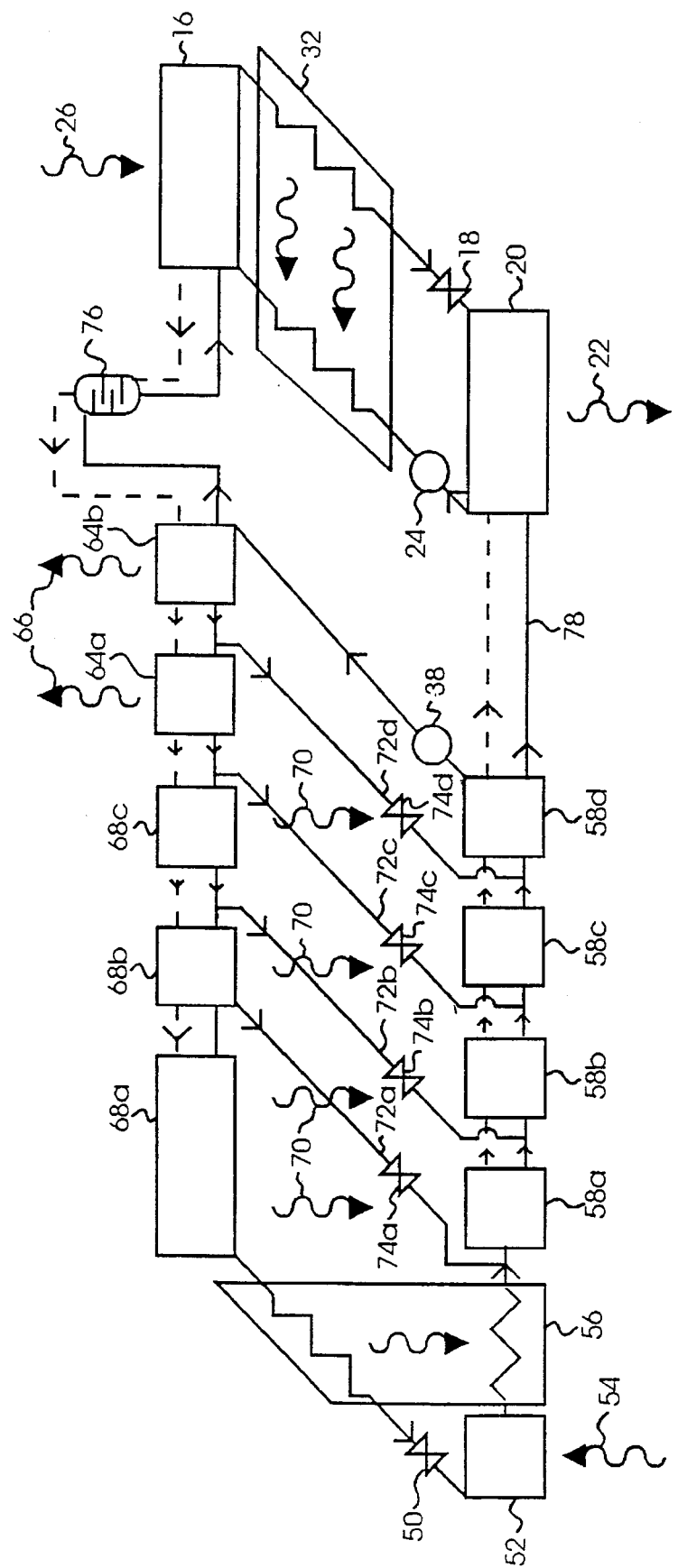
FIG. 4 is a schematic diagram of another embodiment of the invention superimposed on a vapor-liquid-equilibrium diagram.

FIG. 4 is a different embodiment of the invention. The elements 16, 18, 20, 22, 24, 26, and 32 are the same in FIG. 4 as in FIG. 1. The elements 50, 52, 54, and 56 are the same in FIG. 4 as in FIG. 3. This embodiment has four differences from the embodiment of FIG. 3: there are additional branch conduits; the cycle has four temperatures; there are two pumps instead of one; and there is a balance flow.

The heat of absorption 70 produced by the absorbers 68a, 68b, and 68c is transferred, directly or indirectly, to generators 58a, 58b, 58c, and 58d. Branch conduits 72a, 72b, 72c, and 72d and associated restrictors 74a, 74b, 74c, and 74d permit a controlled amount of liquid to flow from the outlets of each of the absorbers 68b, 68c, 64a, and 64b to the inlets of each of the generators 58a, 58b, 58c, and 58d, respectively. This flow allows the heat production of absorbers 68a–68c to be matched very closely to the heat requirements of generators 58a–58d, improving overall system efficiency. The number of absorbers 68, branch conduits 72, restrictors 74, and generators 58 will vary depending on the particular application of the invention. There is no theoretical limit to the total number of branch conduits nor to how closely they can be spaced. However, a practical limit is reached when the cost of additional branches outweighs the added performance benefits.

It is not necessary that the generators 58a–58d actually be separate components. The generators 58a–58d are shown separately to clarify the connection of the branch conduits 72a–72d. For example, the process performed by the generators 58a–58d could be performed in the shell side of a single, vertical heat exchanger. The branch flows from the restrictors 74a–74d could be simply tapped into the shell at the appropriate elevations. The same holds true for absorbers 68b, 68c, 64a, and 64b.

The temperature of the absorber 20 is higher than the temperature of the absorbers 64a and 64b. This cycle, commonly called a "four-temperature" cycle, expels heat at two different temperatures instead of one. In some applications, the temperature at which the heat 66 and the heat 22 are expelled may be of importance. It may be desired to circulate cooling water in series through the absorbers 64a and 64b, and then through the absorber 20. Alternatively, it may be desirable to send the heat 66 to one heat sink and the heat 22 to a different heat sink. The four-temperature cycle provides added flexibility in meeting those needs.

This four temperature cycle uses the pump 24 to pump liquid from the absorber 20 and a separate pump 38 to pump liquid from the generator 58d to the absorber 64b. The use of two pumps is advantageous in this situation because there is a significant difference between the temperature and concentration of liquid at the outlet of the absorber 20 and the outlet of the generator 58d. However, even in cases where the two liquid streams are close in temperature and concentration, it may still be desirable to use two separate pumps.

This four temperature cycle also has a balance flow of liquid from the absorber 64b through an optional column or a contactor 76 to the generator 16. The balance flow may consist of liquid drawn from the absorber 64b or it may consist of liquid delivered by the pump 38. The contactor 76 may be extremely simple, such as a length of straight pipe, or it may be a mass transfer device, such as a bubble-cap column or a packed column. The purpose of the balance flow is to prevent the migration of absorbent or other chemical species throughout the system. When the refrigerant-absorbent pair is ammonia-water, in many cases the vapor passing from the generator 16 to the absorber 64b will contain a greater concentration of absorbent than will the vapor passing from the generator 58d to absorber 20. Over time, the amount of absorbent in the generator 16 and the absorber 20 would decrease; the balance flow prevents this loss of absorbent. A further option is to maintain a balance flow from the generator 58d, via a conduit 78, to the absorber 20. This flow may be drawn from the generator 58d or it may be delivered by a pump.

Figure 5:
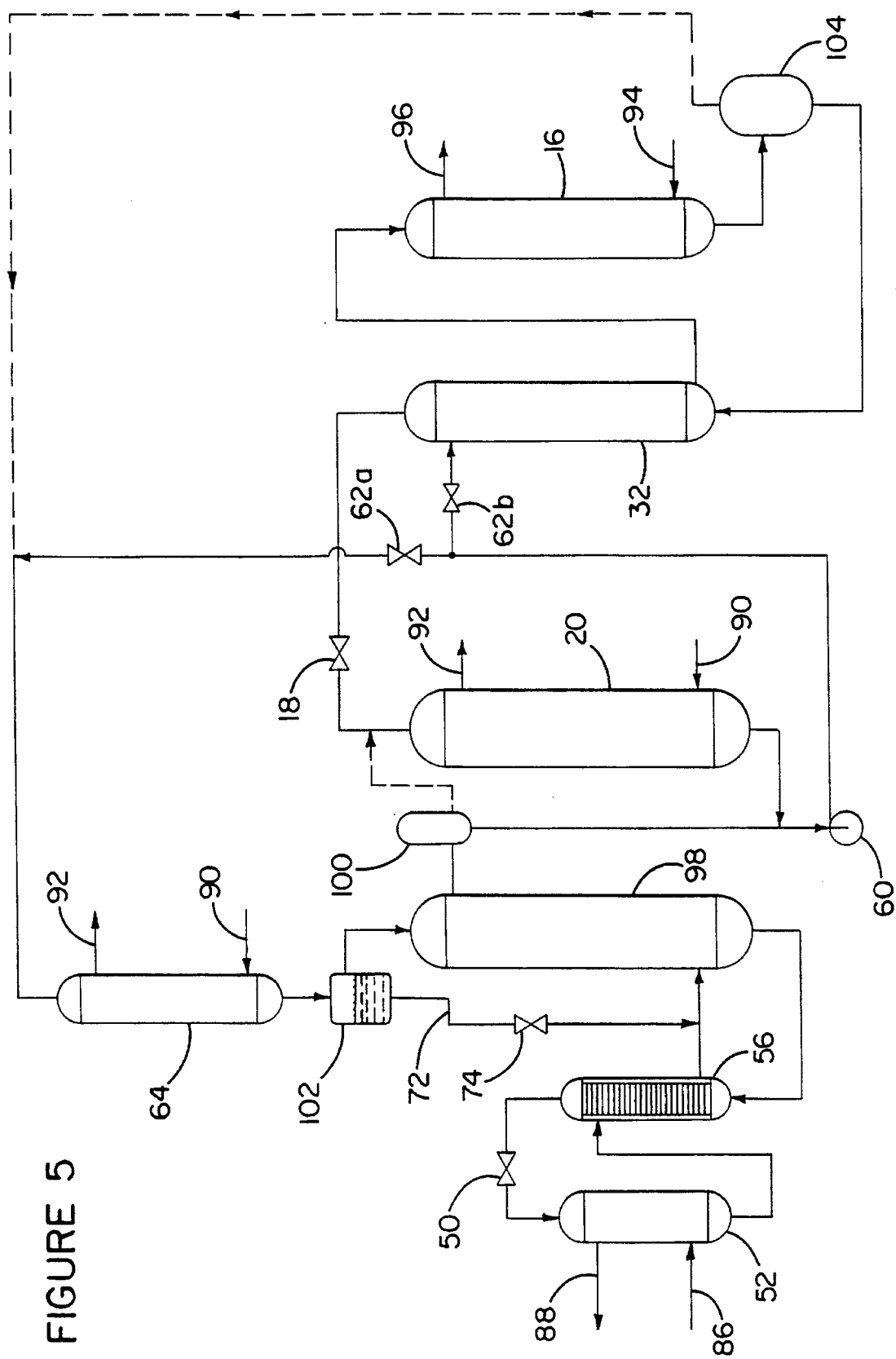
FIG. 5 is a simplified schematic flow diagram of the cycle of FIG. 3.

FIG. 5 is a simplified schematic flow diagram of one embodiment of an apparatus for carrying out the cycle of FIG. 3. Elements 16, 18, 20, 32, 50, 52, 56, 60, 62a, 62b, and 72 are the same as described in connection with FIG. 3. Fluid stream 86 is a flow of a fluid to be cooled, for example, air, glycol, or a process fluid. Stream 88 is the return flow of chilled fluid that is advantageously produced in the invention at a higher lift than in the previously known systems. A heat exchanger 98 includes both the absorber 68 and the generator 58 of FIG. 3. The process of the absorber 68 occurs in the tubes while the process of the generator 58 occurs in the shell of the heat exchanger 98. A vessel 102 ensures that only liquid enters the branch conduit 72. The absorber 64 supplies a two-phase stream to the vessel 102. Under normal conditions, the amount of liquid passing through the conduit 72 is less than the amount of liquid supplied to the vessel 102. The excess liquid will spill over into the tube side of the heat exchanger 98. All of the vapor supplied to the vessel 102 will also pass to the tube side of the heat exchanger 98.

Stream 90 is a supply of cooling fluid, such as cooling water. Stream 92 is the return of cooling fluid to a heat sink. A stream 94 is a hot fluid, preferably derived from waste heat or some other low cost heat source, that is supplied to the generator 16. A stream 96 is the return of the fluid in stream 94 to disposal or to a heat sink. A vessel 100 is a conventional vapor-liquid separator. The heat exchanger 98 supplies a two-phase stream to the vessel 100. All the liquid passes to the pump 60 and all the vapor passes to the absorber 20. A level control system may be required to maintain the liquid level in the vessel 100 at a desired height. A vessel 104 is a vapor-liquid separator similar to the vessel 100. As indicated by the dashed line, vapor from the vessel 104 flows to the absorber 64 in combination with the liquid, indicated by the solid line, from the pump 60. The components schematically illustrated in FIG. 5 are conventionally available.

Figure 6:
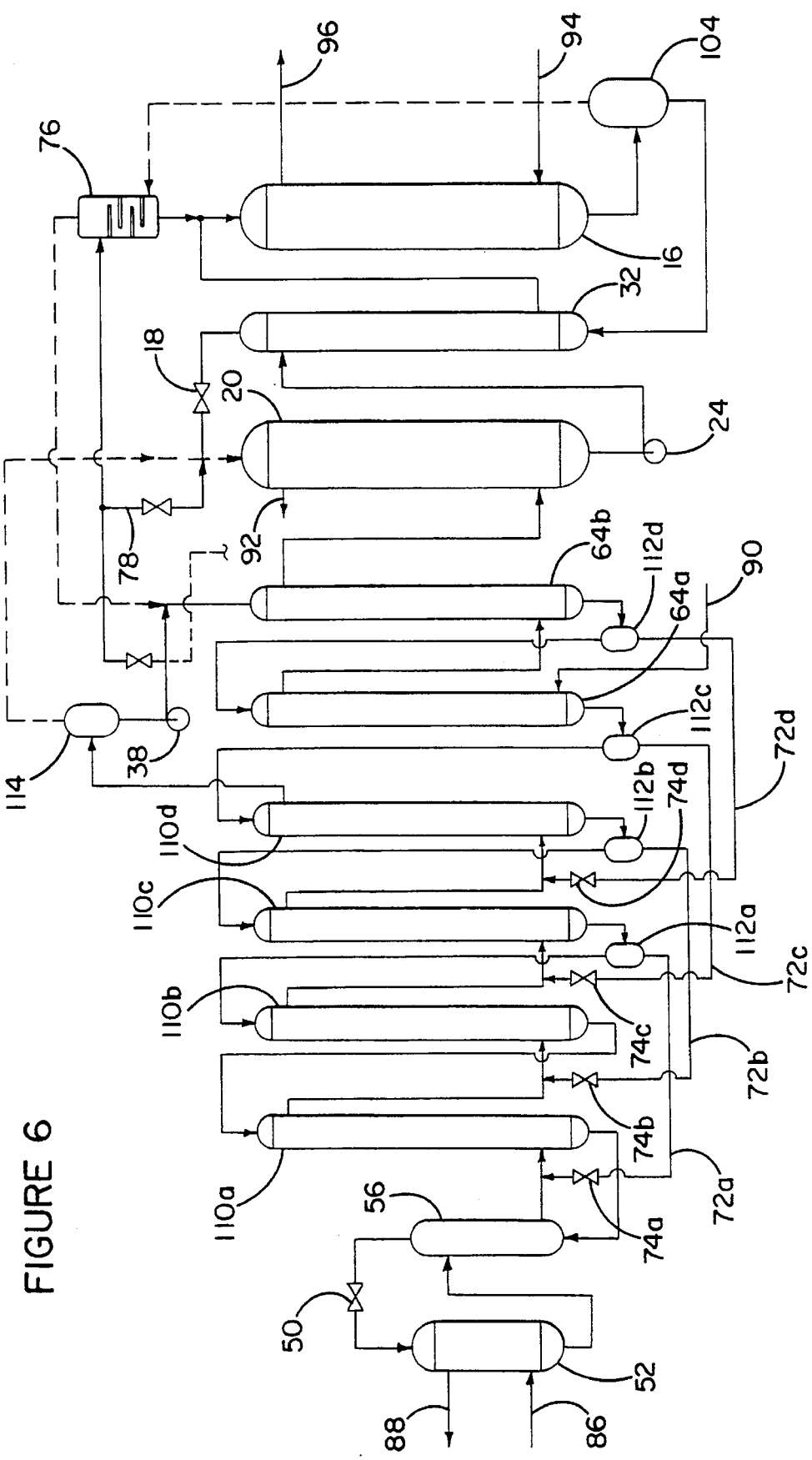
FIG. 6 is a simplified schematic flow diagram of the cycle of FIG. 4.

FIG. 6 is a simplified schematic flow diagram of one embodiment of an apparatus for carrying out the cycle of FIG. 4. Elements 16, 18, 20, 24, 32, 38, 50, 52, 56, 64a, 64b, 72a–72d, 74a–74d, and 76 are the same as described in FIG. 4. Fluid streams 86, 88, 90, 92, 94, and 96 and vessel 104 are the same as described with reference to FIG. 5. A vessel 114 is a conventional vapor-liquid separator that functions similarly to the vessel 100.

The heat exchanger 110a contains the generator 58a and a portion of the absorber 68a from FIG. 4. A heat exchanger 110b contains the generator 58b and the remainder of the absorber 68a. A heat exchanger 110c contains the generator 58c and the absorber 68b. A heat exchanger 110d contains the generator 58d and the absorber 68c. For example, the process of the absorber 68c occurs on the tube side of the exchanger 110d while the process of the generator 58d occurs on the shell side. Vessels 112a–112d function similarly to vessel 102 of FIG. 5. Each of the vessels 112a–112d receives a two-phase fluid stream and separates it into two streams, a liquid stream and a two-phase stream. The liquid stream is supplied to the branch conduits 72a–72d. The two-phase stream is supplied to one of the exchangers as shown in FIG. 6.

Each of FIGS. 3, 4, 5, and 6 shows a different combination of features. However, it is understood that the features may be used in any combination. For example, the balance flow of FIG. 4 may be used in combination with the cycle of FIG. 3. While the methods and apparatus described here are preferred embodiments of the invention, the invention is not limited to these precise methods and forms of apparatus and changes may be made in either without departing from the scope of the invention which is defined by the appended claims.

I claim:

1. A process for absorption heat pumping comprising:

supplying heat to a first generator, thereby desorbing vapor from a solution of absorbent and refrigerant in the first generator, supplying the vapor desorbed in the first generator to a first absorber in which the vapor is partially absorbed into an absorbent solution, thereby producing a mixture of vapor and liquid, supplying the mixture from the first absorber to a second absorber in which vapor is further absorbed into the absorbent solution, thereby producing a strong solution and evolving a heat of absorption, reducing the ambient pressure of the strong solution in a partial evaporator, thereby vaporizing some of the strong solution, and extracting heat from a load, supplying absorbent vapor and liquid from the partial evaporator to an additional generator, thereby producing more vapor and leaving a remaining liquid, the additional generator receiving the heat of absorption evolved by the second absorber, pumping the remaining liquid from the additional generator to the first absorber, supplying vapor from the additional generator to a third absorber in which the vapor is absorbed into an absorbent solution, pumping absorbent solution from the third absorber to the first generator, and supplying absorbent liquid solution from the first generator to the third absorber.

2. The process of claim 1 comprising supplying a portion of the absorbent liquid from the first absorber to the additional generator.

3. The process of claim 1 including combining absorbent liquid from the additional generator and liquid from the third absorber and pumping the combined liquids to a higher pressure, dividing the combined liquids into two streams, supplying one of the streams to the first generator, and supplying the other of the streams to the first absorber.

4. The process of claim 1 including maintaining a flow of liquid from the first absorber to the first generator.

5. The process of claim 1 wherein the refrigerant is ammonia and the absorbent is water.

6. The process of claim 1 wherein the refrigerant is ammonia and the absorbent is selected from the group consisting of water, monomethylamine, dimethylamine, trimethylamine, and mixtures of them.

7. An apparatus for absorption heat pumping comprising:

a first generator receiving heat from an external heat source for generating an absorbent vapor from a solution of an absorbent and a refrigerant, a first absorber connected to receive the vapor from the first generator and cooled by an external source of cooling, a second absorber connected to receive vapor and liquid from the first absorber and cooled by the evolution of heat, a partial evaporator connected to receive absorbent liquid from the second absorber and for drawing heat from a load, an additional generator connected to receive liquid and vapor from the partial evaporator and to receive the heat evolved by the second absorber, and a third absorber connected to receive absorbent liquid from the first generator and absorbent vapor from the additional generator, the additional generator and third absorber being connected to supply absorbent liquid to the first generator and the first absorber.

8. The apparatus of claim 7 wherein the first absorber is connected to supply absorbent liquid to the additional generator.

9. The apparatus of claim 7 including a pump for pumping absorbent liquid from the additional generator and the third absorber to the first generator and the first absorber.

10. The apparatus of claim 7 including a restrictor connected between an outlet of the first absorber and an inlet of the third generator.

11. The apparatus of claim 7 comprising at least two conduits for transporting absorbent liquid from at least one of the first and second absorbers to the additional generator.

12. The apparatus of claim 11 including respective restrictors in the at least two conduits.

13. The apparatus of claim 7 including a contactor connecting the first absorber to the first generator for allowing a flow of absorbent liquid from the first absorber to the first generator.

* * * * *